United States Patent
Masini et al.

(10) Patent No.: US 10,454,371 B1
(45) Date of Patent: Oct. 22, 2019

(54) HIGH EFFICIENCY BUCK-BOOST SYSTEMS AND METHODS

(71) Applicant: Maxim Integrated Products, Inc., San Jose, CA (US)

(72) Inventors: Marco Masini, Milan (IT); Federico Mazzarella, Binasco (IT)

(73) Assignee: Maxim Integrated Products, Inc., San Jose (*) Notice: Subject to any disclaimer, the term of this patent is extended or adjusted under 35 U.S.C. 154(b) by 251 days.

(21) Appl. No.: 14/971,729

(22) Filed: Dec. 16, 2015

Related U.S. Application Data

(60) Provisional application No. 62/158,635, filed on May 8, 2015.

(51) Int. Cl.
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC ............ H02M 3/155–1588; H02M 2001/0009
See application file for complete search history.

(56) References Cited

U.S. PATENT DOCUMENTS

| | | | | |
|---|---|---|---|---|
| 6,166,527 A * | 12/2000 | Dwelley | ............ | H02M 3/1582 323/222 |
| 7,495,419 B1 * | 2/2009 | Ju | .............................. | G05F 1/62 323/225 |
| 9,647,557 B2 * | 5/2017 | Milanesi | ............. | H02M 3/1584 |
| 9,787,187 B2 * | 10/2017 | Cheng | ................. | H02M 3/1582 |
| 2006/0055384 A1 * | 3/2006 | Jordan | .................. | H02M 3/158 323/282 |
| 2006/0176035 A1 * | 8/2006 | Flatness | ................ | H02M 3/156 323/282 |
| 2006/0176036 A1 * | 8/2006 | Flatness | ................ | H02M 3/156 323/282 |
| 2006/0176037 A1 * | 8/2006 | Flatness | .................. | H02M 1/32 323/282 |
| 2006/0176038 A1 * | 8/2006 | Flatness | ................ | H02M 3/156 323/282 |
| 2009/0108823 A1 * | 4/2009 | Ho | ...................... | H02M 3/1582 323/282 |
| 2009/0146623 A1 * | 6/2009 | de Cremoux | ....... | H02M 3/1582 323/271 |
| 2009/0167269 A1 * | 7/2009 | Zhao | ................... | H02M 3/1582 323/282 |

(Continued)

*Primary Examiner* — Yusef A Ahmed
(74) *Attorney, Agent, or Firm* — North Weber & Baugh LLP

(57) ABSTRACT

Various embodiments of the invention provide for a buck-boost circuit that is immune against being stuck in an undesirable mode of operation. The circuit does not require any additional intermediate states other than buck-mode and boost-mode when managing transitions between buck and boost mode. In certain embodiments, a robust and simple buck-boost topology ensures efficient and rapid transitions by operating comparators that are coupled to switching elements of the buck-boost in such a manner that the inductor current can be selectively monitored to detect an inductor current slope during a power transfer phase. Information about the current slope enables a controller to make a decision whether a transition to another state is appropriate.

20 Claims, 6 Drawing Sheets

(56) References Cited

U.S. PATENT DOCUMENTS

| | | | |
|---|---|---|---|
| 2009/0251122 A1* | 10/2009 | Singnurkar | H02M 3/1582 323/311 |
| 2010/0039080 A1* | 2/2010 | Schoenbauer | H02M 3/1582 323/234 |
| 2010/0148740 A1* | 6/2010 | Saitoh | H02M 3/1582 323/283 |
| 2010/0320992 A1* | 12/2010 | Dearn | H02M 3/1582 323/311 |
| 2011/0037446 A1* | 2/2011 | Engelhardt | H02M 3/1582 323/282 |
| 2011/0089917 A1* | 4/2011 | Chen | H02M 3/1584 323/282 |
| 2011/0121806 A1* | 5/2011 | Garrett | H02M 3/156 323/282 |
| 2011/0156685 A1* | 6/2011 | Chen | H02M 3/1582 323/284 |
| 2011/0187336 A1* | 8/2011 | Wu | G05F 1/10 323/282 |
| 2011/0199062 A1* | 8/2011 | Singnurkar | H02M 3/1582 323/282 |
| 2011/0241636 A1* | 10/2011 | Wu | H02M 3/1584 323/272 |
| 2012/0074916 A1* | 3/2012 | Trochut | H02M 3/1582 323/271 |
| 2012/0119715 A1* | 5/2012 | Loikkanen | H02M 3/1582 323/235 |
| 2012/0153915 A1* | 6/2012 | Loikkanen | G05F 1/618 323/283 |
| 2012/0200276 A1* | 8/2012 | Van Dijk | H02M 3/158 323/283 |
| 2012/0229110 A1* | 9/2012 | Huang | H02M 3/1582 323/282 |
| 2012/0286576 A1* | 11/2012 | Jing | H02M 3/156 307/43 |
| 2013/0088209 A1* | 4/2013 | Huang | G05F 1/46 323/271 |
| 2013/0293204 A1* | 11/2013 | Lu | H02M 3/1582 323/234 |
| 2013/0307508 A1* | 11/2013 | Hallak | H02M 3/1582 323/282 |
| 2013/0328534 A1* | 12/2013 | Hsieh | G05F 3/02 323/271 |
| 2014/0084882 A1* | 3/2014 | Namekawa | G05F 1/46 323/271 |
| 2014/0084883 A1* | 3/2014 | Tanabe | H02M 3/1582 323/271 |
| 2014/0197811 A1* | 7/2014 | Qiu | H02M 3/1582 323/282 |
| 2014/0217996 A1* | 8/2014 | Peker | H02M 3/1582 323/271 |
| 2014/0225577 A1* | 8/2014 | Ivanov | H02M 3/1582 323/225 |
| 2014/0354250 A1* | 12/2014 | Deng | H02M 3/1582 323/271 |
| 2015/0171744 A1* | 6/2015 | Fabbro | H02M 3/1582 323/234 |
| 2015/0357914 A1* | 12/2015 | Ozanoglu | H02M 3/158 323/271 |
| 2015/0357916 A1* | 12/2015 | Yoon | H02M 3/1582 323/271 |
| 2015/0381039 A1* | 12/2015 | Hari | H02M 1/15 323/271 |
| 2016/0094125 A1* | 3/2016 | Milanesi | H02M 3/1584 323/271 |
| 2016/0105110 A1* | 4/2016 | Houston | H02M 3/1582 323/271 |
| 2016/0164411 A1* | 6/2016 | Chen | H02M 3/1582 323/271 |
| 2016/0190931 A1* | 6/2016 | Zhang | H02M 3/1582 323/271 |
| 2016/0294278 A1* | 10/2016 | Li | H02M 3/156 |
| 2016/0301303 A1* | 10/2016 | Bari | H02M 3/156 |
| 2016/0315535 A1* | 10/2016 | Ouyang | H02M 3/1582 |
| 2016/0352222 A1* | 12/2016 | Tagliavia | H02M 3/156 |
| 2016/0352228 A1* | 12/2016 | Zhang | H02M 1/32 |
| 2016/0365790 A1* | 12/2016 | Ye | H02M 3/1582 |
| 2017/0207704 A1* | 7/2017 | Houston | H02M 3/1582 |

\* cited by examiner

US 10,454,371 B1

HIGH EFFICIENCY BUCK-BOOST SYSTEMS AND METHODS

CROSS REFERENCE TO RELATED PATENT APPLICATIONS

This application claims priority to U.S. Provisional Application Ser. No. 62/158,635, titled "High Efficiency Buck-Boost Systems and Methods," filed on May 8, 2015, by Marco Masini and Federico Mazzarella, which application is incorporated herein by reference in its entirety.

BACKGROUND

A. Technical Field

The present invention relates to battery-driven power regulators and, more particularly, to systems, devices, and methods for high efficiency buck-boost regulators.

B. Background of the Invention

A typical buck-boost has four switches and can be operated in various ways to regulate an output voltage that may be higher or lower than the input voltage. For example, two or four switches can be turned on and off within a single switching cycle. It is known that turning on and off all switches of the four-switch buck-boost within the same switching cycle is an inferior and less efficient method of operation. Therefore, in order to maintain high efficiency, it is desirable to activate as few switches as possible in each switching cycle, such that for the same amount of average output current the overall losses stay as low as possible. Existing four-switch buck-boost circuits are thus operated by constantly transitioning between a buck mode and a boost mode of operation, such that only two switches are active in each switching cycle rather than all four switches. However, activating two switches within the same switching cycle requires that transitions from buck mode to boost mode and vice versa be properly managed. Such buck-to-boost or boost-to-buck transitions are typically controlled in one of two ways. A first method compares the input voltage to the output voltage, whereas a second method is based on duty-cycle width. Unfortunately, both methods involve a risk of getting stuck in the wrong state when managing buck-boost transitions in existing circuits. This causes the circuit to remain in buck mode when, in fact, the input voltage is below the output voltage. Attempts to eliminate this risk typically involves providing some margins around the transition zones. However, virtually all such approaches suffer from an unwanted increase in current ripple in the transition zone itself and from a reduction in overall circuit efficiency. What is needed are tools for power regulator designers to overcome the above-described limitations.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
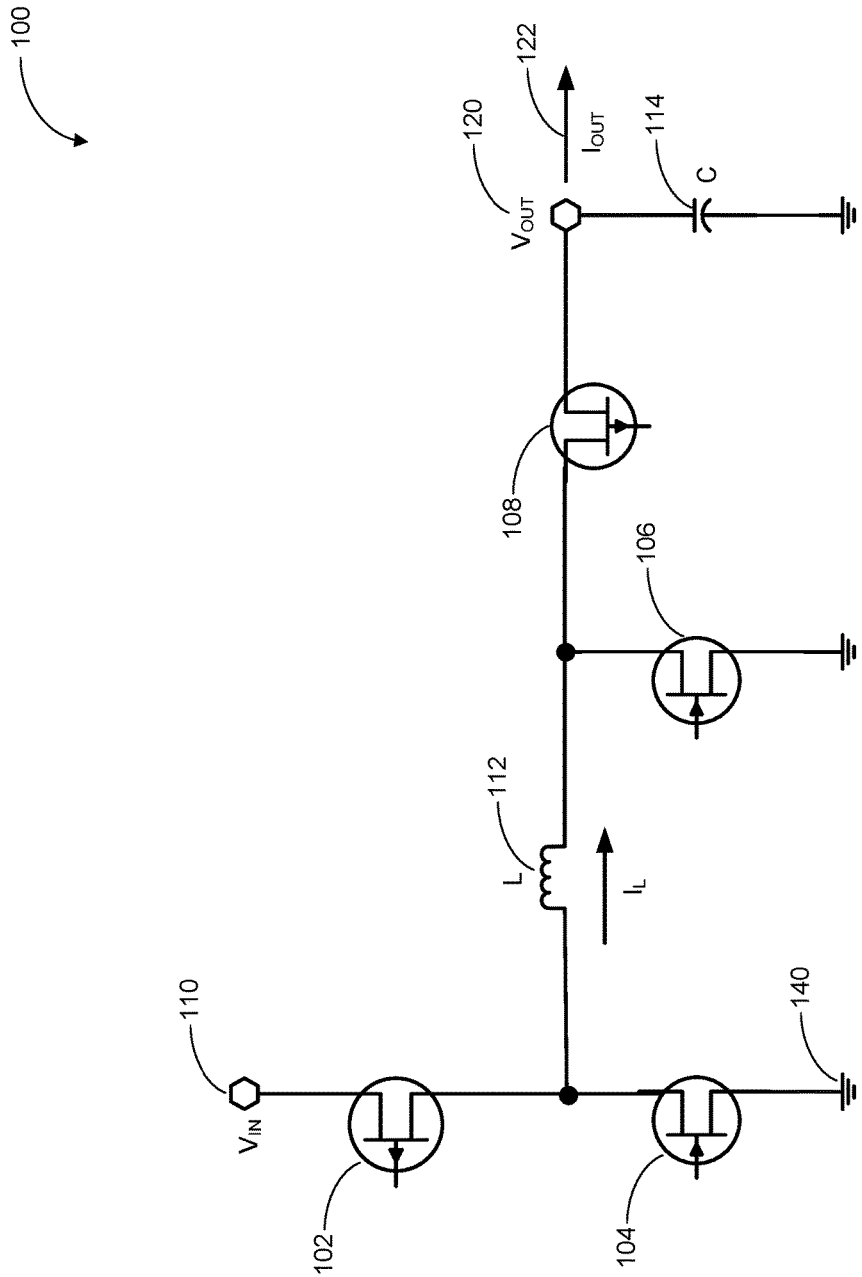
FIG. 1 shows a common buck-boost circuit as is exists in the prior art.

With reference to FIG. 1, in boost mode, switch 102 is always on, switch 104 is always off, and switch 106-108 is alternately operated within a switching cycle. Conversely, in buck mode, switch 108 is always on, switch 106 is always off, and switch 102, 104 is alternately active within a switching cycle. By design, the boost mode is used to generate a higher output voltage 120 than input voltage 110, whereas the buck mode is used to generate a required output voltage 120 that is below input voltage 110. In instances when input voltage 110 is near output voltage 120, a transition between modes has to be controlled. In existing designs, this is accomplished for example by sensing a difference between input voltage 110 and output voltage 120, and if output voltage 120 is below input voltage 110, then circuit 100 is operated in buck mode. Conversely, if output voltage 120 is higher than input voltage 110, circuit is operated in boost mode.

However, in scenarios where the load current 122 is relatively high, e.g., due to a low-impedance load (not shown), there may be circumstances in which circuit 100 switches to buck mode once it is detected that output voltage 120 falls below the input voltage 110, e.g., due to relatively high losses in switch 102-104-108. However, boost mode operation of circuit 100 would be preferable to allow the current through inductor 112 to achieve its target level even if input voltage 110 is higher than output voltage 120. Such a heavily loaded circuit 100 is prone to failure and at risk of malfunctioning when engaging in transitions between buck and boost mode. A margin is thus provided to enlarge the transition zone when transitioning between boost and buck mode. The extent of the margin depends on the $R_{DS\_ON}$ of FETs 102-108 as well as on process and temperature parameters and on load current 122, which all are not easily predictable design parameters.

Yet other approaches may add additional states between buck and boost to manage transitions and provide the necessary margin to avoid the risk of remaining locked in the wrong state. For example, a state with a fix boost time prior to transitioning to buck mode may be used. Additional states, however, are known to unnecessarily increase complexity and reduce efficiency.

In other existing designs, the transition is sensed by detecting a duty cycle. Still with reference to FIG. 1, assuming a transition from operation in buck mode to boost mode is desired, once a maximum set buck duty cycle (e.g., a value near 100%) is reached, so that the buck can no longer raise its output voltage, a transition to boost mode occurs even if circuit 100 were heavily loaded. Since the actual maximum buck duty cycle the buck can obtain is process, temperature, and load dependent, again, a margin has to be built-in to accommodate these parameters by enlarging the transition zone for the crossing threshold of the duty cycle in order to avoid transition failures in scenarios when the maximum available duty cycle of the buck is below a set threshold. Unfortunately, this causes buck-boost circuit 100 oftentimes to transition into an undesired mode when it would be preferable to continue to operate in the present mode. The non-optimal transition zone, therefore, results in non-optimal performance. Therefore, it would be desirable to have systems and methods that do not use either the voltage or duty cycle information of the prior art regulators to manage transitions between modes of operation.

As will be explained next, embodiments of the present invention utilize inductor current information that is based on two important observations. First, with reference to FIG. 2, inductor current 218 can be monitored and sensed at one of switch $P_{BUCK}$ 202 and $P_{BOOST}$ 208, virtually at all times. For example, when operating in boost mode, switch 202 is always turned on, such that inductor current 218 can be sensed in both phases of the boost cycle. In a first phase, when inductor current 218 charges inductor 212 when $N_{BOOST}$ switch 206 is turned on. And in a second phase, when inductor 212 is discharged to the output via $P_{BOOST}$ switch 208. In both cases, inductor current 218 flows through $P_{BUCK}$ switch 202 that is always turned on in boost mode and in series with $P_{BOOST}$ switch 208. Thus, inductor current 218 can be monitored and sensed at $P_{BUCK}$ switch 202, for example, by comparator 230.

Similarly, when circuit 200 operates in buck mode, $P_{BOOST}$ switch 208 receives inductor current 218 as switch 208 is always turned on in both phases of the buck mode. Again, inductor current 218 can, thus, be monitored and sensed at $P_{BOOST}$ switch 208, such that inductor current 218 can be known at all times.

Figure 3:
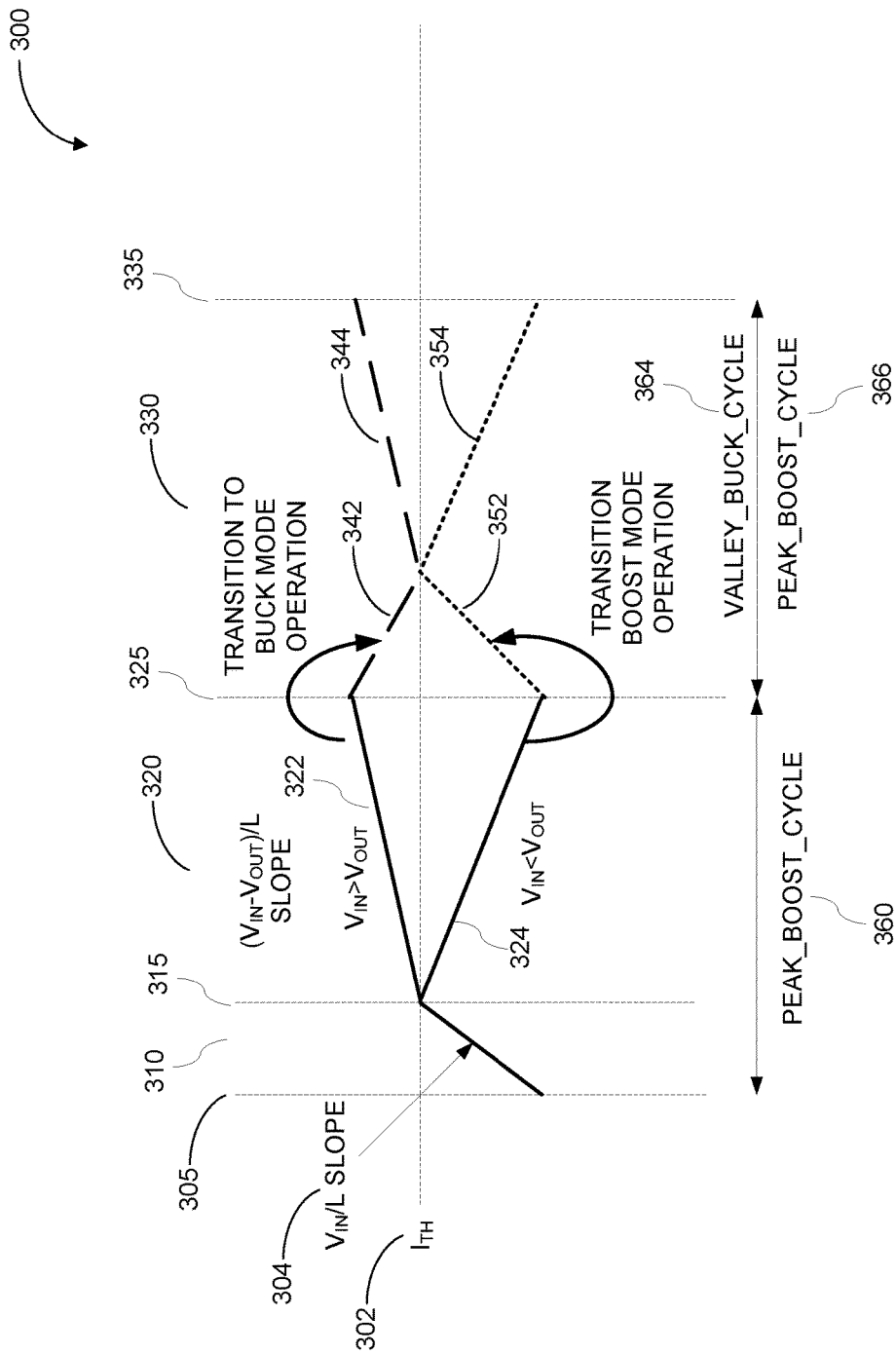
FIG. 3 illustrates exemplary transitions performed by buck-boost circuit of FIG. 2, according to various embodiments of the invention.

The second important observation will be explained with respect to FIG. 3. As shown in FIG. 3, in a first phase during boost cycle 360, the charge phase 310 of the inductor, the inductor is charged to a certain threshold current level 302 (e.g., 100 mA) with current slope $V_{IN}/L$ 304. Once the current reaches threshold level 302, charging phase 310 is halted in favor of charge transfer phase 320 in which current is moved to the output capacitor by activating the $P_{BUCK}$ and $P_{BOOST}$ switches while switches $N_{BUCK}$ and $N_{BOOST}$ remain inactive. Depending on the condition at the inductor, this will result either in charging phase 322 or discharging phase 324 that control the current in the inductor.

In discharge phase 324, when the inductor current flows towards the output capacitor, the inductor releases energy to the output of the buck-boost circuit. In this phase 320, the input voltage, $V_{IN}$, is lower than the output voltage $V_{OUT}$, such that the inductor current has negative slope 324. Conversely, if the input voltage is greater than the output voltage, the inductor current rises with positive slope 322. One of ordinary skill in the art will appreciate that the actual input voltage, $V_{IN}$, takes into account other factors, such as the $R_{DS\_ON}$ of the respective switches involved.

Figure 2:
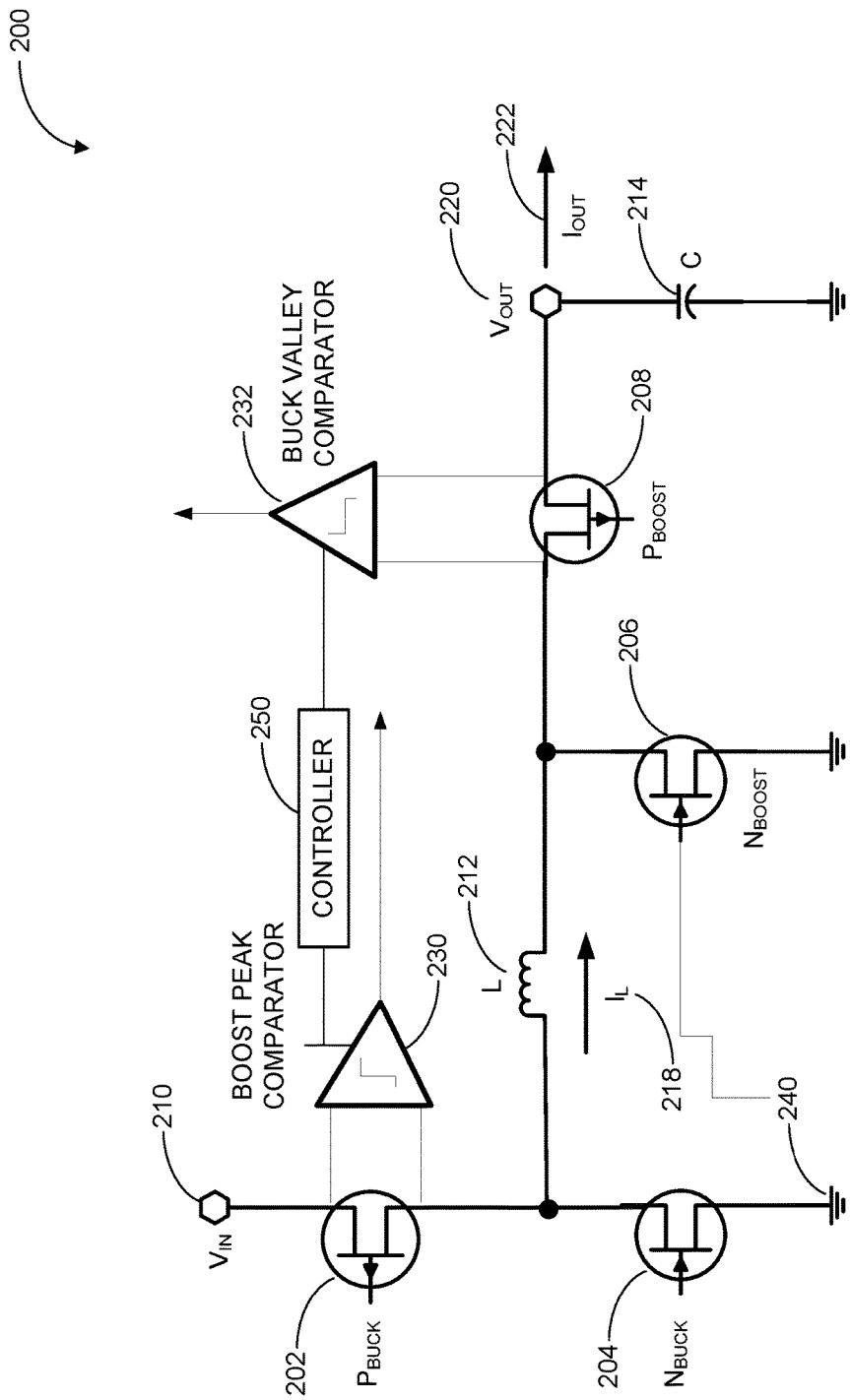
FIG. 2 illustrates a buck-boost circuit according to various embodiments of the present invention.

If at the end 325 of boost cycle 360 the output voltage, $V_{OUT}$, is higher than the input voltage, $V_{IN}$, inductor current 324 decreases, and a sampling of the $P_{BUCK}$ comparator (boost peak comparator) that is coupled across the $P_{BUCK}$ switch (as seen in FIG. 2) provides low state. In embodiments, this information is used to control the transition between buck mode and boost mode. In this example, the information is used to cause the circuit to transition from a boost mode to another boost mode of operation 366. Conversely, if at the end 325 of boost cycle 360 the output voltage, $V_{OUT}$, is lower than the input voltage, $V_{IN}$, inductor current 322 still rises because the output voltage is lower than the input voltage, and a sampling of the $P_{BOOST}$ comparator that is coupled to the $P_{BUCK}$ switch provides high state, thereby, indicating that the system should transition into buck mode of operation 364.

By knowing whether the current slope is positive or negative, which is related to the real voltage across the inductor when the input voltage is connected to the output voltage through the inductor, it can thus be determined what the next cycle should be without having to constantly monitor the current across the inductor. Sampling the current twice, once at a peak or valley when one of the comparators changes into a high state at the crossing of the threshold, and then again at the end 325 of the cycle 360 provides two points from which a current slope can be determined, e.g., from $V_L = L*I_{SLOPE}$, from which the polarity of the effective voltage difference $V_{IN}-V_{OUT}$ across the inductor may be inferred. If at the end of the cycle the current is higher than the threshold current, it can be deduced that the input voltage exceeds the output voltage across the inductor.

In embodiments, a high peak comparator value sampled at the end of a cycle 325 indicates that the output voltage is below the input voltage, such that the next cycle should be a buck cycle, whereas a low peak comparator value sampled at the end of a cycle indicates that a transition to the boost mode as a next cycle is appropriate. In other words, the comparators sense whether the inductor current is above or below the threshold current value 302. If above, the respective comparator assumes a high state, whereas if the inductor current is below threshold current 302, the respective comparator assumes a low state. When the inductor current is temporarily equal to threshold current 302, the peak comparator may temporarily respond with a high state and remain there for a period of time based on a delay of the peak comparator. At time 325, when the output voltage is greater than the input voltage, no transition to buck mode is required. Instead, the system can remain in boost mode.

Referring back to FIG. 2, once inductor 212 charges to its peak current value, boost peak comparator 230 (also referred to as $P_{BUCK}$ comparator) assumes a high state, which causes a controller 250 that is selectively coupled to both boost peak comparator 230 and buck valley comparator 232 (also referred to as $P_{BOOST}$ comparator) to turn off switch $N_{BOOST}$ 206 and turn on $P_{BOOST}$ switch 208 to allow inductor current 218 to flow to output capacitor 214 and the load. If at the end of the boost cycle, boost peak comparator 230 is still in a high state, i.e., inductor current 218 is still at or above peak current level 302, the next cycle should be a buck cycle. Conversely, if at the end of the boost cycle boost peak comparator 230 assumes a low state, i.e., inductor current 218 has decreased, indicating that input voltage 210 is lower than output voltage 220, then operation in the boost mode should be continued.

This avoids the major problems suffered by prior art designs. For example, unlike in the prior art that in a scenario operating in buck mode cannot reach the desired output voltage and goes into the maximum duty cycle that may still not sufficiently increase the load current, the present invention detects the effective polarity of the voltage across inductor 212 and enables an appropriate transition to the boost mode. Comparator 230-232 may be implemented by any comparator design known in the art and sense current or voltage (e.g., threshold current*$R_{DS\_ON}$ of $P_{BOOST}$ switch 202).

In embodiments, at the end of a cycle, the controller senses the status of boost peak comparator 230 or buck valley comparator 232. If the current cycle is a buck mode, valley comparator 232 coupled to $P_{BOOST}$ 208 is used to arbitrate a buck-to-boost transition. Depending of the state of comparator 230-232 at the end of each cycle, a decision is made whether to transition to the other mode. The sampling of peak comparator 230 and valley comparator 232 at peaks and valleys combined with sampling the status at the end of each cycle, in effect, causes peak comparator 230 and valley comparator 232 to act as current slope detectors for inductor current 218. Each subsequent cycle may either be a buck or a boost cycle, as determined by the status of the peak or valley comparator 230-232 at the end of that cycle. It is noted that since there are possible delays, the manner in which cycles occur will depend on such delays, output current 222, $V_{IN}$ 210, $V_{OUT}$ 220, $R_{DS\_ON}$, etc. In embodiments, comparators 230-232 that control inductor current 218 within a switching cycle to manage transitions between modes are implemented as comparators that are activated when a feedback circuit (not shown) is activated. The feedback circuit may control the threshold levels of the comparators by sensing an output voltage error and comparing it to a reference voltage level.

Figure 4:
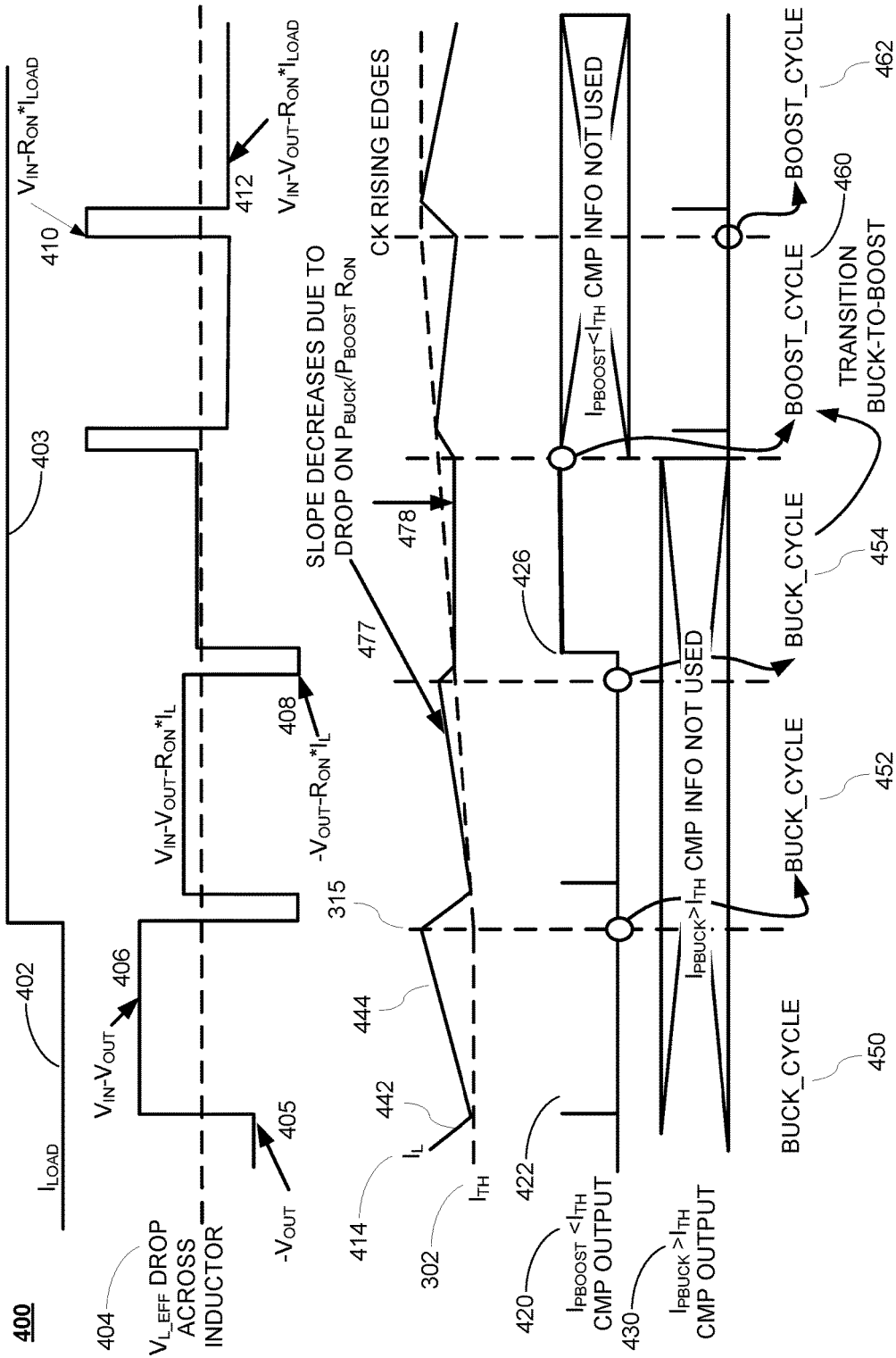
FIG. 4 illustrates an exemplary operation of buck-boost circuit of FIG. 2 after initialization, according to various embodiments of the invention.

FIG. 4 illustrates an exemplary operation of buck-boost circuit of FIG. 2 after initialization, according to various embodiments of the invention. The displayed graphs depict an increase in load current 402, 403; effective voltage drop 404 across the inductor resulting from the high load current; inductor current $I_L$ 414; and comparator output signals for boost peak 430 and buck valley comparators 420. The effective voltage drop 404 across the inductor is a function of the elevated load current 403.

As shown in FIG. 4, at relatively low load current 402, the effective voltage drop 404 across the inductor is approximately equal to the output voltage 405 while inductor current 414 decreases in buck cycle 450 and is approximately equal to the difference between input and output voltage 406 when inductor current 444 increases. In contrast, at relatively high load current 403, the voltage drop across the switching elements has to be factored into the effective voltage drop 404 across the inductor 408-412, respectively. In embodiments, the duration of each cycle 450-462 is determined by a fixed frequency clock (e.g., a 2 MHz clock). However, this is not intended as a limitation, as the duration of cycle 450-462 may be variable, such that in order to obtain current slope information, the status of each comparator may be sampled at a variable frequency. In embodiments, sampling occurs a certain time after a comparator detects a peak, a valley, or any other predetermined event.

In operation, in a buck cycle, once the inductor is discharged 442 to threshold level 302, such that inductor current 442 starts to fall below threshold current 302, this is detected by the buck valley comparator that temporarily outputs a high signal 422. This causes the controller to commence a charge transfer by closing $P_{BUCK}$ and $P_{BOOST}$ switches (see FIG. 2) that allows inductor current 414 to pass to the output and increase until the end of buck cycle 450, thereby, controlling the valley current in the inductor. As mentioned previously, at the end 315 of buck cycle 450, the controller makes a decision whether to transition to a boost cycle depending on whether inductor current 414 is above or below a threshold current 302, which is indicative of the slope of inductor current 414. At the end of the first buck cycle 450 the buck valley comparator 420 outputs a low signal because inductor current 414 is still above threshold current 302.

As a result of load step 402-403, inductor current 414 gradually increases to reach load current level 403. The feedback loop reacts to the drop in output voltage caused by load step 403 by increasing threshold current 302. The decline of the slope of inductor current 414 coupled with the increase of threshold current 302 may cause inductor current level 414 to fall below threshold current level 302 at the end of buck cycle 454, which may force the device to transition to boost cycle 460 in order to increase inductor current 414 to a desired value, in effect, to maintain the regulated output voltage at a desired level irrespective of load current 402, 403.

Overall, at the end of each cycle 450-462, it is known whether load current 414 has increased or decreased (or remained the same), i.e., whether the slope of load current 414 is positive or negative, which slope, in turn, is related to the output voltage. It is based on this slope information that the controller decides whether to transition or not.

As shown in FIG. 4, at the end of first buck cycle 450, load current 402, 403 increases significantly. As a result, the output voltage decreases and the feedback loop (not shown) increases threshold current 302 to increase inductor current level 414. A relatively large voltage drop occurs across all switches and the actual voltage across the inductor decreases, which causes current slope 477, 478 to decrease. However, since inductor current 414 was still rising and higher than threshold current 302 at the end of second buck cycle 452, the sampled $P_{BOOST}$ comparator output 420 delivered a low signal shortly prior to inductor current 414 falling below the level of threshold current 302. As a consequence, the buck-boost circuit remains in buck mode for the remainder of buck cycle 454, until at the end of third buck cycle 454 inductor current 414 has decreased so far as to drop below threshold current 302. As a result, the sampled $P_{BOOST}$ comparator output 420 senses a high signal causing the system to move to boost cycle 460, such that output voltage can rise to the requested regulated voltage, and the slope of inductor current 414 may become negative again during the phase in which both $P_{BUCK}$ and $P_{BOOST}$ are turned on. Upon completion of the transition from buck cycle 454 to boost cycle 460, all of load current, $I_{LOAD}$, 403 flows through the inductor leading to a steady state output voltage at the desired regulation level.

This occurs despite the fact that the input voltage is in fact higher than the output voltage, which in prior art systems forces a buck cycle and causes the output voltage to drop even further. In contrast, here, the system can move to boost cycle 460 and regulate itself to increase the output voltage as needed. Each of the two comparators is used not only to determine a current slope by monitoring inductor current 414 the end of a cycle 450-462 to decide whether to change to another state, but also to detect peaks and valleys within a cycle by using the same comparator twice.

It is noted that if two different comparators were used, there may be additional offset issues that are not be discussed herein in greater detail. It is also noted that the information of the $P_{BUCK}$ comparator output 430 has not been used throughout buck cycle 450-454 as, in general, the status of the inactive comparator is irrelevant. Similarly, once boost cycle 460 starts and $P_{BUCK}$ comparator output 430 turns low, the controller need no longer be concerned with the status of $P_{BOOST}$ comparator output 420 until the inductor current at the end of a boost cycle eventually exceeds the threshold current again.

In embodiments, when the input voltage is near or at the output voltage, buck cycle and boost cycle may alternate. If the delay between the boost mode, buck mode, and comparator were perfectly equal, then the ripple would be symmetric over the threshold current. In practice, however, the amplitude of the ripple current of the inductor will depend on non-idealities such as the internal delay of the comparators, such that the ripple current will not be symmetrical over the threshold current. The system will alternate between buck and boost cycles, wherein one of the two cycles will have the minimum intrinsic possible duration, such that the feedback circuit that controls the output voltage and the $T_{ON}$-time will have control only during the cycle (buck or boost) that does not have the minimum duration.

One advantage is that still only two states, boost and buck, may be used without requiring a third state as in existing systems that unnecessarily increase the switching frequency. Here, the switching frequency can be kept constant even during the transition phases. Another advantage is that transitions between buck and boost cycles occur at the minimum or maximum possible intrinsic duty cycle, thereby, allowing for the smallest possible transition zones.

Figure 5:
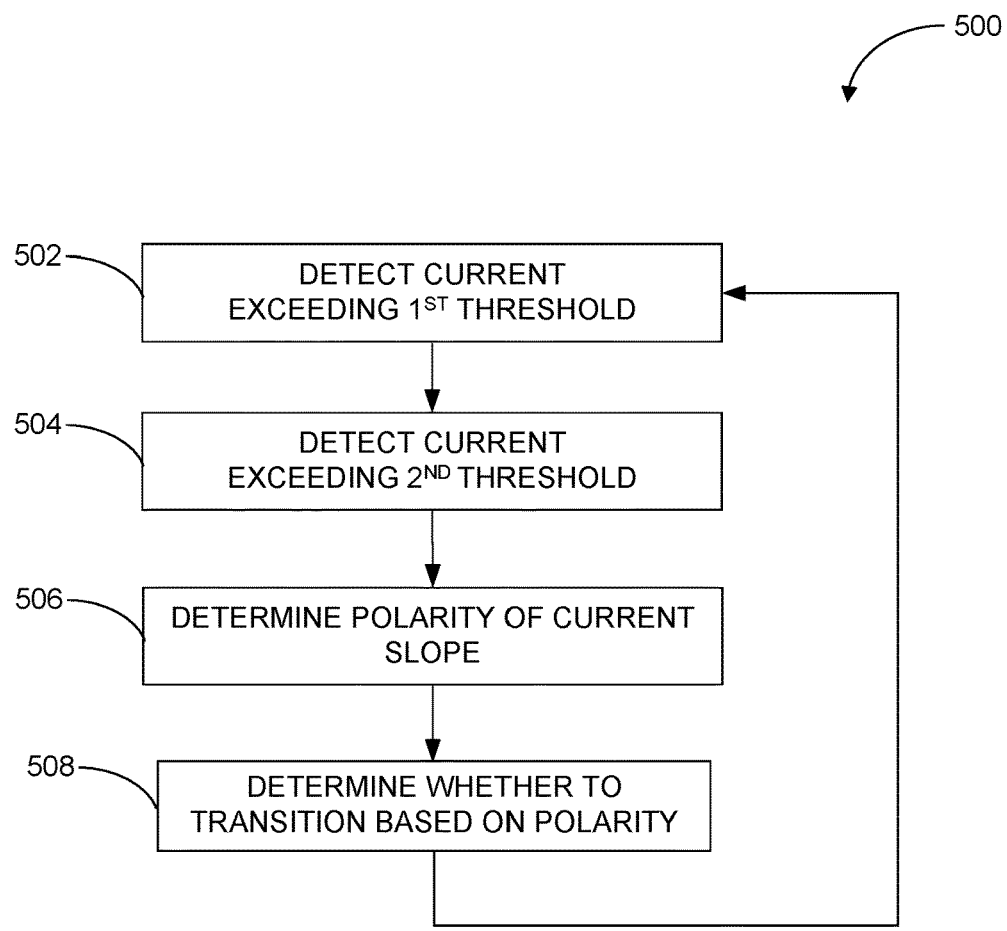
FIG. 5 is a flowchart of an illustrative process for transitioning between a buck and a boost mode of operation in accordance with various embodiments of the invention.

FIG. 5 is a flowchart of an illustrative process for transitioning between a buck and a boost mode of operation in accordance with various embodiments of the invention. The process 500 for transitioning between a buck and a boost mode of operation begins at step 502 when it is detected that an inductor current exceeds a first threshold value. Detection may be based on an inference from a voltage-based detection.

At step 504, it is detected that the inductor current exceeds a second threshold value. In embodiments, both the first and second threshold values are current threshold values.

At step 506, a current slope associated with the first and second current threshold values and having a certain polarity is determined based on the two threshold values. In embodiments, the polarity is indicative of a voltage drop across an inductor.

Finally, at step 508, the polarity is used to determine whether to initiate a buck-to boost or a boost-to-buck transition within a buck-boost circuit.

Figure 6:
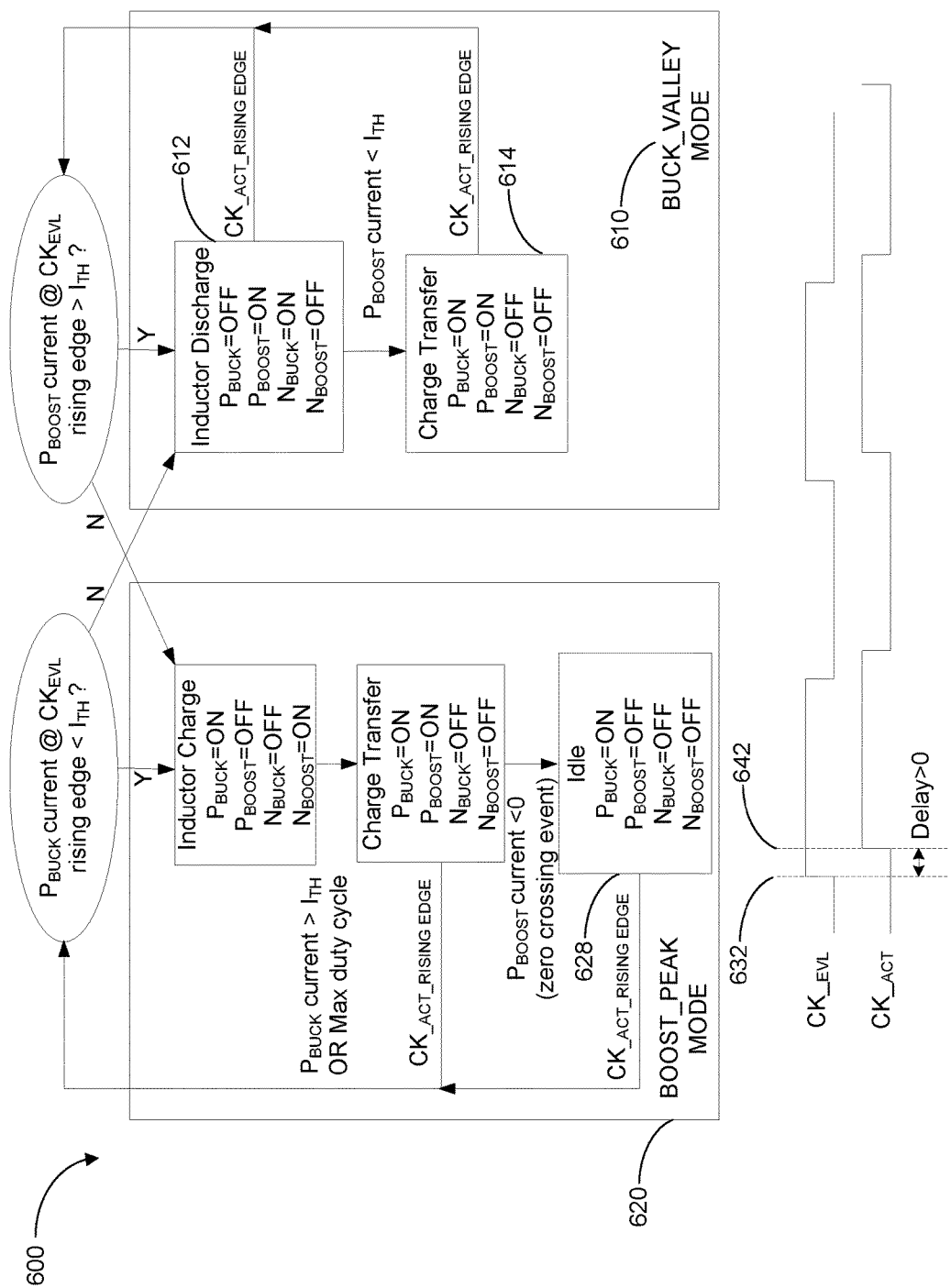
FIG. 6 is a flowchart of an exemplary process for transitioning between buck and boost modes of operation based on clock signals, according to various embodiments of the invention.

FIG. 6 is a flowchart of an exemplary process for transitioning between buck and boost modes of operation based on clock signals, according to various embodiments of the invention. In embodiments, steps in process 600 are clocked by two clocks—evaluating clock 630 and actuating clock 640. Evaluating clock 630 evaluates whether the next cycle should be a buck cycle or a boost cycle based on a comparator sampling. In embodiment, this evaluation takes place a few nsec. prior to the rising edge of actuating clock 640 to decide which mode to operate in next.

In contrast, at rising edge 642 of actuating clock 640, the inductor is either charged or discharged depending on the mode of operation. For example, once process 600 enters buck valley mode 610, the inductor is discharged by turning on switches $N_{BUCK}$ and $P_{BOOST}$ at step 612. Once the current through the $P_{BOOST}$ switch falls below the threshold current, $I_{TH}$, charge transfer 614 is initiated by turning on switch $P_{BUCK}$ and tuning off switch $N_{BUCK}$ and process 600 exits step CK_ACT_RISING EDGE in order to continue with the evaluating clock rising edge and the decision point for the next activating clock to further charge the inductor. Conversely, if $P_{BOOST}$ is higher than the threshold current, process 600 continues to remain in buck valley mode 610.

In example in FIG. 6, boost peak mode 620 has three states, including idle state 628. A person of ordinary skill in the art will appreciate that various steps in process 600 may be performed by a state machine.

It will be appreciated by those skilled in the art that fewer or additional steps, such as, e.g., an initialization step, may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

The invention claimed is:

1. A method to transition between buck and boost modes, the method comprising:
   in response to a comparator detecting whether an inductor current reaches, within a clock cycle, a threshold value, using a controller to initiate a charge transfer that causes the inductor current to change direction;
   using the comparator to detect whether, at the end of the clock cycle, the inductor current is above or below the threshold value, wherein the inductor current indicates a slope of the inductor current; and
   based on the detection at the end of the of the clock cycle, using the controller to determine whether to initiate a direct transition from a buck mode of operation to a boost mode of operation or vice versa.

2. The method according to claim 1, wherein a polarity of the slope is determined in one of a charge phase and a charge transfer phase of the inductor.

3. The method according to claim 1, wherein the comparator is coupled across a switch that is coupled to the inductor.

4. The method according to claim 3, further comprising determining a status of the comparator via the controller.

5. The method according to claim 3, further comprising detecting peaks and valleys within the clock cycle by using the comparator two or more times within a cycle.

6. The method according to claim 3, wherein sampling the comparator is performed at a variable frequency.

7. The method according to claim 6, wherein the comparator, in response to determining that the inductor current equals the threshold value, remains at a high state for a predetermined amount of time that is based on a delay time of the comparator.

8. The method according to claim 3, wherein the comparator is sampled when the inductor current exceeds the threshold value and again at an end of a boost cycle to determine a polarity.

9. The method according to claim 1, wherein initiating the transition to the buck mode of operation occurs in response to detecting a high comparator value at the end of a boost cycle.

10. A buck-boost regulator comprising:
an inductor;
a switch coupled to the inductor;
a comparator coupled to the switch, the comparator detects whether an inductor current reaches, within a clock cycle, a threshold value;
a controller that initiates a charge transfer that causes the inductor current to change direction, the comparator detects whether, at the end of the clock cycle, the inductor current is above or below the threshold value, wherein the inductor current indicates a slope of the inductor current; and
based on the detection at the end of the of the clock cycle, the controller determines whether to initiate a direct transition from a buck mode of operation to a boost mode of operation or vice versa.

11. The buck-boost regulator according to claim 10, wherein the controller determines a status of the comparator and arbitrates the transition.

12. The buck-boost regulator according to claim 11, wherein the controller determines the slope in one of a charge phase and a charge transfer phase of the inductor.

13. The buck-boost regulator according to claim 10, further comprising-adjusting a threshold level of the comparator.

14. The buck-boost regulator according to claim 13, further comprising sensing an output voltage error that is compared to a reference voltage level.

15. The buck-boost regulator according to claim 10, wherein the comparator is a peak comparator that is sampled when the inductor current exceeds the threshold value, and at an end of a boost cycle, to determine whether the inductor current is above or below the threshold value.

16. A buck-boost regulator system comprising:
buck-boost regulator comprising a first comparator coupled to a first switch and a second comparator coupled to a second switch; and
a controller selectively coupled to the first and second comparators, the controller controls the first comparator to detect whether a first current through the first switch reaches a first threshold within a first clock cycle, and whether the first current through the first switch reaches a second threshold at the end of the first clock cycle, the controller further controls the second comparator to detect whether a second current through the second switch reaches a third threshold within a second clock cycle, and whether the second current through the second switch reaches a fourth threshold at the end of the second clock cycle, wherein the respective thresholds for each comparator are used to determine whether, at the end of each respective clock cycle, an inductor current is above or below the respective thresholds, wherein the inductor current has a slope that is representative of a voltage across an inductor, and wherein the buck-boost regulator is configured to directly transition back and forth from one mode of operation to another based on the detection at the end of each respective clock cycle.

17. The buck-boost regulator system according to claim 16, wherein at least one of the first and second comparators is configured to act as a current slope detector.

18. The buck-boost regulator system according to claim 17, wherein, in order to determine a polarity, the first comparator detects a current slope at the first threshold and at the second threshold, wherein the second threshold is at an end of a boost cycle.

19. The buck-boost regulator system according to claim 16, wherein initiating a transition from a boost mode of operation to a buck mode of operation occurs in response to detecting a high comparator value at the end of a boost cycle.

20. The buck-boost regulator system according to claim 16, wherein at least one of the first comparator and second comparator detects one of a peak and a valley at least two times within at least one of the first clock cycle or the second clock cycle.

\* \* \* \* \*